United States Patent
Sugawara et al.

(10) Patent No.: US 8,748,048 B2
(45) Date of Patent: Jun. 10, 2014

(54) FUEL CELL SYSTEM INCLUDING WATER INJECTION DEVICE AND RETURN PASSAGE BYPASSING COMPRESSOR

(75) Inventors: Tatsuya Sugawara, Wako (JP); Motohiro Suzuki, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 341 days.

(21) Appl. No.: 13/076,431

(22) Filed: Mar. 31, 2011

(65) Prior Publication Data

US 2011/0244343 A1    Oct. 6, 2011

(30) Foreign Application Priority Data

Mar. 31, 2010    (JP) ................. 2010-081226

(51) Int. Cl.
H01M 8/04    (2006.01)
H01M 8/06    (2006.01)

(52) U.S. Cl.
USPC .................. 429/414; 429/444; 429/513

(58) Field of Classification Search
USPC ......... 429/413, 416, 429, 450, 436, 442, 414, 429/444, 513
See application file for complete search history.

(56) References Cited

U.S. PATENT DOCUMENTS

| | | | |
|---|---|---|---|
| 5,432,020 A | 7/1995 | Fleck | |
| 6,268,074 B1 | 7/2001 | Siepierski et al. | |
| 6,635,374 B1 | 10/2003 | Aramaki | |
| 2004/0166387 A1* | 8/2004 | Imamura et al. | 429/22 |
| 2007/0026276 A1* | 2/2007 | Ogawa et al. | 429/22 |
| 2009/0155651 A1* | 6/2009 | Orihashi | 429/22 |

FOREIGN PATENT DOCUMENTS

| | | | |
|---|---|---|---|
| JP | 06-132038 | 5/1994 | |
| JP | 2000-188119 | 7/2000 | |
| JP | 2000-294265 | 10/2000 | |
| JP | 2000-315509 | 11/2000 | |
| JP | 2006-040713 | 2/2006 | |
| JP | 2006-164728 | 6/2006 | |
| JP | 2008/311081 A1 * | 12/2008 | ............. H01M 8/04 |

OTHER PUBLICATIONS

Machine Translation of: JP 2006/164728A, Sakakida et al., Jun. 22, 2006.*
Machine Translation of: JP 2006/040713A, Sakakida et al., Feb. 9, 2006.*
Japanese Office Action for corresponding JP Application No. 2010-081226, Mar. 9, 2012.

* cited by examiner

*Primary Examiner* — Kenneth Douyette
(74) *Attorney, Agent, or Firm* — Ditthavong Mori & Steiner, P.C.

(57) ABSTRACT

A fuel cell system includes a fuel cell, an oxidant-gas supply passage, a compressor, a water injection device, a return passage, and a regulation valve. The fuel cell is to generate power utilizing an electrochemical reaction between oxidant gas and fuel gas. The oxidant gas flows toward the fuel cell through the oxidant-gas supply passage. The compressor is provided in the oxidant-gas supply passage. The compressor is capable of sucking and pressurizing the oxidant gas to discharge the oxidant gas toward the fuel cell. The water injection device is to inject water toward a suction port of the compressor. The return passage connects an upstream portion in the oxidant-gas supply passage upstream the compressor and a downstream portion in the oxidant-gas supply passage downstream the compressor to bypass the compressor. Opening of the regulation valve is adjustable. The regulation valve is provided in the return passage.

2 Claims, 2 Drawing Sheets

US 8,748,048 B2

FUEL CELL SYSTEM INCLUDING WATER INJECTION DEVICE AND RETURN PASSAGE BYPASSING COMPRESSOR

CROSS-REFERENCE TO RELATED APPLICATIONS

The present application claims priority under 35 U.S.C. §119 to Japanese Patent Application No. 2010-081226, filed Mar. 31, 2010, entitled "Fuel Cell System Including Water Injection Device." The contents of this application are incorporated herein by reference in their entirety.

BACKGROUND OF THE INVENTION

1. Field of the Invention

The present invention relates to a fuel cell system.

2. Description of the Related Art

An example of a fuel cell of the related art is formed by a fuel cell stack in which a plurality of unit cells, for example, several hundred unit cells are stacked. Each unit cell is formed by a layered body including a membrane electrode assembly (MEA) shaped like a flat plate and separators stacked on either side of the MEA. The MEA has a three-layer structure in which an electrolyte membrane formed of ion-exchange resin or the like is provided between a pair of electrodes serving as a positive electrode (air electrode, cathode) and a negative electrode (fuel electrode, anode). In such a fuel cell, for example, when fuel gas is run through a gas flow passage facing a gas diffusion electrode on the fuel electrode side and oxidant gas is run through a gas flow passage facing a gas diffusion electrode on the air electrode side, an electrochemical reaction occurs to generate power.

To stabilize the above-described electrochemical reaction and to maintain a high power generation efficiency, it is necessary to keep the electrolyte membrane in a water-saturated state so as to ensure the function of ion-exchange resin. For example, Japanese Unexamined Patent Application Publication No. 6-132038 discloses a fuel cell system using moisture exchange. In this fuel cell system, air sent from a blower is applied to a humidifying unit, and moisture contained in used air exhausted from a fuel cell stack (hereinafter sometimes referred to as cathode off-gas or off-gas) and used fuel gas (hereinafter sometimes referred to as anode off-gas or off-gas) is applied to the air, that is, moisture change is performed in the humidifying unit.

FIG. 2 illustrates an exemplary configuration of such a fuel cell system. As illustrated in FIG. 2, for example, when air is sucked from the atmosphere by a compressor 12 of a Lysholm type or a Roots type, oxidant gas is supplied to a cathode side of a fuel cell stack 10 through a flow passage 20 (oxygen in the air is used as oxidant). At the same time, off-gas containing water generated in the fuel cell is supplied to a humidifier 11 through a flow passage 21, and the humidifier 11 performs moisture exchange between the supply oxidant gas and the off-gas, so that the oxidant gas to be supplied to the fuel cell stack 10 can become moist.

However, the humidifier 11 includes a flat vapor permeation membrane having a large surface area and multiple hollow fibers such as to perform sufficient moisture exchange between the supply oxidant gas and the off-gas. Therefore, the size of the humidifier 11 itself is large. In particular, it is difficult to reduce the size of a system to be mounted in the vehicle.

Further, in a low air volume area of the compressor 12, air leaks from a rotor clearance, and the air supply efficiency of the compressor 12 becomes lower than in a high air volume area.

As measures against these problems, Japanese Unexamined Patent Application Publication No. 2000-294265 proposes a technique of injecting generated water in a fuel cell to a compressor provided on a supply oxidant-gas flow passage in order to avoid the decrease in efficiency of the compressor. According to this technique, an additive flow rate is given by injection of the generated water, and this can enhance the efficiency of the compressor in the low air volume area.

SUMMARY OF THE INVENTION

According to one aspect of the present invention, a fuel cell system includes a fuel cell, an oxidant-gas supply passage, a compressor, a water injection device, a return passage, and a regulation valve. The fuel cell is to generate power utilizing an electrochemical reaction between oxidant gas and fuel gas which are supplied to the fuel cell. The oxidant gas flows toward the fuel cell through the oxidant-gas supply passage. The compressor is provided in the oxidant-gas supply passage. The compressor is capable of sucking and pressurizing the oxidant gas to discharge the oxidant gas toward the fuel cell. The water injection device is to inject water toward a suction port of the compressor. The return passage connects an upstream portion in the oxidant-gas supply passage upstream the compressor and a downstream portion in the oxidant-gas supply passage downstream the compressor to bypass the compressor. Opening of the regulation valve is adjustable. The regulation valve is provided in the return passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
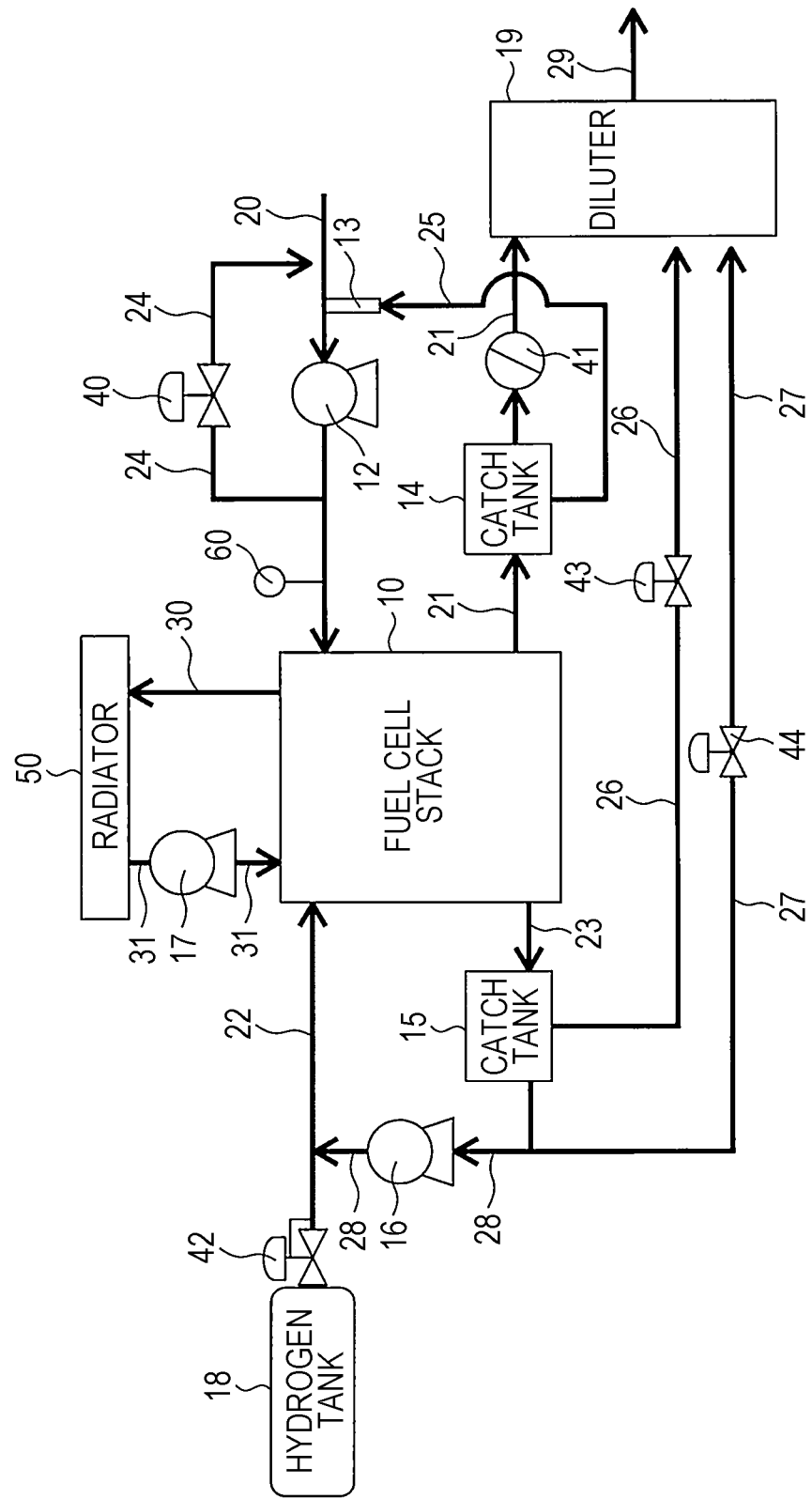
FIG. 1 is a system diagram of a fuel cell system according to an embodiment of the present invention.
Figure 2:
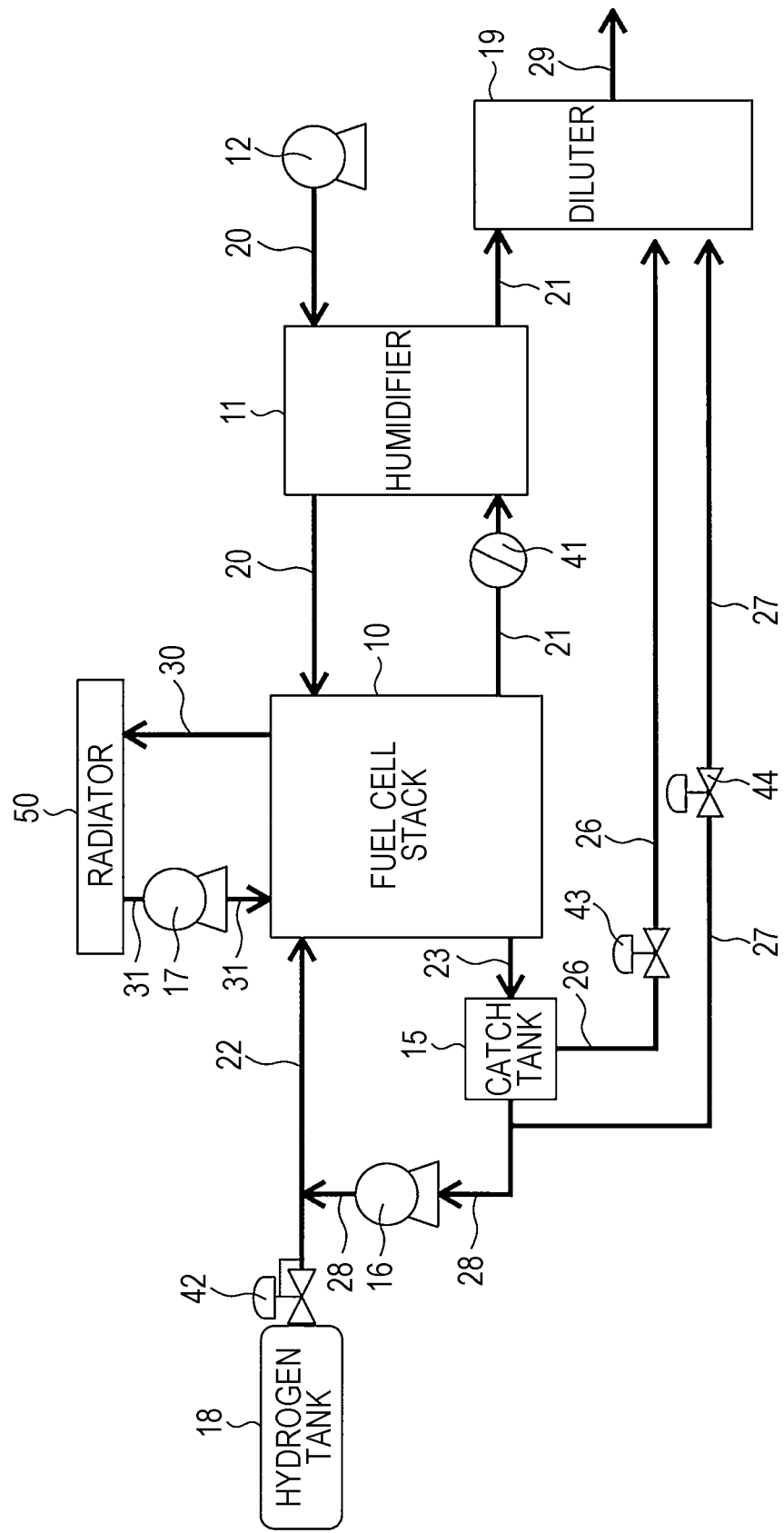
FIG. 2 is a system diagram of a fuel cell system of the related art.

The embodiments of the present invention will be described below with reference to FIG. 1, wherein like reference numerals designate corresponding or identical elements throughout the various drawings. Referring to FIG. 1, a fuel cell stack 10 is formed by multiple stacked unit fuel cells. A first pipe (oxidant-gas supply passage) 20 through which oxidant gas (air) flows is connected to an oxidant-gas supply port of the fuel cell stack 10. A compressor (oxidant-gas supply unit) 12 is provided on the first pipe 20. The compressor 12 sucks air serving as oxidant gas from the atmosphere, compresses the air, and discharges the air to the fuel cell stack 10.

A second pipe (exhaust oxidant-gas flow passage) 21 through which exhaust oxidant gas containing water generated by an electrochemical reaction of the fuel cell flows is connected to an oxidant-gas exhaust port of the fuel cell stack 10. On the second pipe 21, a catch tank (reservoir) 14 that receives the generated water contained in the exhaust oxidant gas, a back pressure valve 41, and a diluter 19 are arranged.

The opening of the back pressure valve 41 is adjustable such as to arbitrarily adjust the pressure and flow rate of the supplied oxidant gas. The diluter 19 mixes the exhaust oxidant gas introduced from the second pipe 21 and exhaust fuel gas introduced from a below-described eighth pipe, adjusts the hydrogen concentration to be lower than or equal to a predetermined value, and sends exhaust gas to a tenth pipe (final exhaust passage).

A third pipe (fuel-gas supply passage) 22 through which fuel gas (hydrogen) flows is connected to a fuel-gas supply port of the fuel cell stack 10. On the upstream side of the third pipe 22, a hydrogen tank 18 is provided with a regulator 42 being disposed therebetween. Hydrogen in the hydrogen tank 18 is supplied to the fuel cell stack 10 while adjusting the pressure and flow rate of hydrogen by the regulator 42.

A fourth pipe (exhaust fuel-gas flow passage) 23 through which exhaust fuel gas containing water generated by an electrochemical reaction of the fuel cell flows is connected to a fuel-gas exhaust port of the fuel cell stack 10. A catch tank 15 for receiving the generated water contained in the exhaust fuel gas is provided on the fourth pipe 23.

On a cathode side and downstream of the compressor 12, a fifth pipe 24 (oxidant-gas return passage) branches off from the first pipe 20, and is connected to an upstream side of a water injection valve (water injection unit) 13 provided upstream of the compressor 12. An oxidant-gas return valve 40 is connected to the middle of the fifth pipe 24 so as to adjust the flow rate of the oxidant gas. Further, a sixth pipe 25 (water circulation passage) branches off from the catch tank 14 on the second pipe 21, and is connected to an upstream side of the compressor 12 on the first pipe 20 via the water injection valve 13. A part of the generated water from the catch tank 14 is injected from the sixth pipe 25 into the oxidant gas.

A hygrometer (moisture-content measuring unit) 60 is connected to a downstream side of the compressor 12 on the first pipe 20, and measures the humidity (moisture content) of the oxidant gas to be supplied to the fuel cell stack 10. By inputting the measurement result from the hygrometer 60 to an unillustrated control unit connected thereto, control can be performed to adjust the opening of the oxidant-gas return valve 40. The control unit can adopt known methods. For example, on-off control can be performed so that the oxidant-gas return valve 40 is fully opened to maximize the circulation amount when the humidity is lower than a predetermined reference humidity, and is fully closed to stop circulation when the humidity is higher than the predetermined reference humidity. Alternatively, the circulation amount can be adjusted without setting the predetermined reference humidity, by maximizing the opening of the oxidant-gas return valve 40 when the humidity is the lowest and continuously decreasing the opening of the oxidant-gas return valve 40 with the increase in humidity.

From the catch tank 15 provided on the fourth pipe 23 on an anode side, a seventh pipe (exhaust fuel-gas flow passage) 26, an eighth pipe (exhaust fuel-gas flow passage) 27, and a ninth pipe (exhaust fuel-gas return passage) 28 branch off. The seventh pipe 26 and the eighth pipe 27 are connected to the diluter 19 via a drain valve 43 and a purge valve 44, respectively. The ninth pipe 28 is connected to the third pipe 22 via a compressor (fuel-gas-side circulation supply unit) 16 so as to circulatively supply exhaust fuel gas and a part of generated water in the catch tank 15 into the fuel gas.

To prevent the generated water exhausted into the fourth pipe 23 from accumulating, the drain valve 43 is opened at an appropriate timing to guide the water collected in the catch tank 15 to the diluter 19. Further, to prevent impurities, such as nitrogen, flowing from the cathode side into the third pipe 22 and the fourth pipe 23 from gradually accumulating, the purge valve 44 is opened at an appropriate timing to guide the gas in the third pipe 22 and the fourth pipe 23 to the diluter 19.

According to the embodiment of the present invention described above, since water is injected from the water injection valve 13 into the oxidant gas to be supplied, backflow and leakage from the rotor clearance can be suppressed even in a low air volume area of the compressor 12, and this enhances the air supply efficiency of the compressor 12. Further, the oxidant gas into which the water is injected is sucked, pressurized, and discharged by the compressor 12, and a part of the oxidant gas then separates, returns upstream of the compressor 12, and passes through the compressor 12 again. Hence, the temperature of the discharged gas increases and the saturated vapor amount increases, so that oxidant gas sufficiently and properly humidified can be supplied to the fuel cell. Thus, a humidifier is unnecessary in the fuel cell system.

Moreover, according to the embodiment of the present invention, the generated water contained in the exhaust oxidant gas can be supplied to the water injection valve and recycled to be used in oxidant gas. Hence, it is unnecessary to provide an external water supply pipe for humidification.

In addition, according to the embodiment of the present invention, the opening of the oxidant-gas return valve can be adjusted by measuring the humidity of the oxidant gas with the hygrometer and feeding the measurement result back to the control unit. Therefore, for example, when the moisture content is insufficient, the opening of the regulation valve is increased to increase the amount of oxidant gas to be circulated. In contrast, when the moisture content is sufficient or excessively large, the opening of the regulation valve is decreased to decrease the amount of oxidant gas to be circulated. This control allows the temperature of the oxidant gas to be supplied to the fuel cell to be always kept at an optimal temperature.

According to the embodiment of the present invention, the humidity of the oxidant gas to be supplied to the fuel cell is measured and the amount of humidification can be controlled on the basis of the measured humidity. Therefore, stable operation of the fuel cell is ensured. Accordingly, the fuel cell system of the embodiment of the present invention can be advantageously applied to a fuel cell system for an automobile that requires high reliability.

According to the embodiment of the present invention, in the fuel cell system having the above-described configuration, the pressure on the discharging side of the compressor is higher than on the suction side, and therefore, a part of the discharged oxidant gas naturally circulates toward the suction side through the return passage. Further, water is injected into the sucked oxidant gas by the water injection unit, and a part of the oxidant gas pressurized and discharged by the compressor is circulated toward the suction side upstream of the compressor, and is pressurized and discharged again by the compressor. Thus, the temperature of the discharged gas can be further increased by the compression heat in the compressor, and the saturated vapor amount of the discharged oxidant gas can be increased. As a result, the amount of vapor contained in the discharged oxidant gas can be increased.

Preferably, the fuel cell system further includes a moisture-content measuring unit provided on the oxidant-gas supply passage and downstream of the compressor and a control unit connected to the moisture-content measuring unit, and the control unit controls the opening of the regulation valve on the basis of a moisture content measured by the moisture-content measuring unit.

In the fuel cell system having the above-described configuration, the moisture-content measuring unit is provided downstream of the compressor, that is, upstream of an oxidant-gas supply port of the fuel cell. The moisture content of the oxidant gas to be supplied to the fuel cell is measured, and the opening of the regulation valve on the return passage can be adjusted on the basis of the measurement result. That is, the opening of the regulation valve can be increased to increase the amount of oxidant gas to be circulated when the moisture content is insufficient, and is decreased to decrease the amount of oxidant gas to be circulated when the moisture content is sufficient or excessively large.

Preferably, the fuel cell system further includes an oxidant-gas exhaust passage through which exhaust oxidant gas from the fuel cell flows and a reservoir provided on the oxidant-gas exhaust passage, the reservoir storing the water from the exhaust oxidant gas, and the water injected by the water injection unit is introduced from the reservoir.

In the fuel cell system having the above-described configuration, generated water discharged from the fuel cell is temporarily stored, and is then supplied to the water injection unit to be used to humidify the supply oxidant gas. Hence, water for humidification can be recycled without being externally supplied.

According to the fuel cell system of the embodiment of the present invention, the air supply efficiency is enhanced by water injection even in the low air volume area of the compressor. Moreover, the saturated vapor amount can be increased by the compressor and the water injection unit, and the oxidant gas properly humidified can be supplied to the fuel cell. In addition, the humidifier that hinders size reduction of the system can be omitted.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
   a fuel cell to generate power utilizing an electrochemical reaction between oxidant gas and fuel gas which are supplied to the fuel cell;
   an oxidant-gas supply passage through which the oxidant gas flows toward the fuel cell;
   a compressor provided in the oxidant-gas supply passage and capable of sucking and pressurizing the oxidant gas to discharge the oxidant gas toward the fuel cell;
   a water injection device to inject water toward a suction port of the compressor;
   a return passage connecting an upstream portion in the oxidant-gas supply passage upstream of the compressor and a downstream portion in the oxidant-gas supply passage downstream of the compressor to bypass the compressor;
   a regulation valve whose opening is adjustable and which is provided in the return passage;
   a moisture-content measuring device provided in the oxidant-gas supply passage downstream of the compressor and downstream of the downstream portion of the return passage; and
   a controller connected to the moisture-content measuring device,
   wherein the controller is configured to control the opening of the regulation valve based on a moisture content measured by the moisture-content measuring device.

2. The fuel cell system according to claim 1, further comprising:
   an oxidant-gas exhaust passage through which exhaust oxidant gas from the fuel cell flows; and
   a reservoir provided in the oxidant-gas exhaust passage to store the water from the exhaust oxidant gas,
   wherein the water to be injected by the water injection device is introduced from the reservoir.

* * * * *